United States Patent
Tsujino et al.

(10) Patent No.: US 12,497,063 B2
(45) Date of Patent: Dec. 16, 2025

(54) VEHICLE INFORMATION OUTPUT CONTROL DEVICE, VEHICLE INFORMATION OUTPUT CONTROL METHOD, AND STORAGE MEDIUM

(71) Applicant: TOYOTA JIDOSHA KABUSHIKI KAISHA, Toyota (JP)

(72) Inventors: Miki Tsujino, Nagakute (JP); Sara Yamafuji, Miyoshi (JP); Makoto Suzuki, Seto (JP); Takatoshi Hattori, Nagoya (JP); Keigo Hori, Toyota (JP); Kazuhisa Murakami, Toyota (JP); Shinji Ohba, Toyota (JP); Tomoki Yoshimoto, Okazaki (JP); Rikuto Kubota, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 76 days.

(21) Appl. No.: 18/526,273

(22) Filed: Dec. 1, 2023

(65) Prior Publication Data

US 2024/0208527 A1  Jun. 27, 2024

(30) Foreign Application Priority Data

Dec. 26, 2022 (JP) ................. 2022-209002

(51) Int. Cl.
*B60W 50/14* (2020.01)
*B60K 35/28* (2024.01)
*B60W 30/18* (2012.01)

(52) U.S. Cl.
CPC ............. *B60W 50/14* (2013.01); *B60K 35/28* (2024.01); *B60W 30/18163* (2013.01); *B60K 2360/171* (2024.01); *B60K 2360/188* (2024.01); *B60K 2360/349* (2024.01); *B60W 2050/143* (2013.01); *B60W 2050/146* (2013.01); *B60W 2520/06* (2013.01)

(58) Field of Classification Search
CPC .......... B60W 50/14; B60W 30/18163; B60W 2050/143; B60W 2050/146; B60W 2520/06; B60K 35/28; B60K 2360/171; B60K 2360/188; B60K 2360/349
See application file for complete search history.

(56) References Cited

U.S. PATENT DOCUMENTS 12,168,437 B2 *  12/2024  Yoshida ................. B60W 30/12
2014/0257686 A1 *  9/2014  Feldman ......... B60W 30/18163
                                                                701/300
2015/0142207 A1 *  5/2015  Flehmig ............. G01C 21/3492
                                                                701/1

(Continued)

FOREIGN PATENT DOCUMENTS

EP   3428033 A1 *  1/2019 ............. B60K 35/00
JP   3888572 B2 *  3/2007

(Continued)

*Primary Examiner* — Chico A Foxx
(74) *Attorney, Agent, or Firm* — Oliff PLC

(57) ABSTRACT

A vehicle information output control device includes a processor. The processor acquires direction information on a direction in which a lane change is possible by activation of a lane change assist system. Based on the direction information, the processor causes a display unit in a vehicle cabin to output a direction image indicating the direction in which the lane change is possible.

7 Claims, 6 Drawing Sheets

(56) References Cited

U.S. PATENT DOCUMENTS

| | | | |
|---|---|---|---|
| 2015/0321699 A1* | 11/2015 | Rebhan | B60W 30/18163 |
| | | | 701/23 |
| 2017/0253181 A1* | 9/2017 | Choi | B60R 1/23 |
| 2018/0178713 A1 | 6/2018 | Fujii | |
| 2018/0178715 A1* | 6/2018 | Fujii | B60W 50/10 |
| 2018/0178716 A1 | 6/2018 | Fujii | |
| 2018/0281855 A1* | 10/2018 | Talamonti | G02B 27/01 |
| 2019/0315362 A1* | 10/2019 | Um | B60W 50/10 |
| 2020/0039584 A1* | 2/2020 | Igarashi | B62D 1/286 |
| 2020/0086890 A1* | 3/2020 | Ikeda | G09G 5/37 |
| 2021/0061300 A1* | 3/2021 | Adam | B60W 30/18163 |
| 2022/0118983 A1 | 4/2022 | Yagyu et al. | |
| 2023/0311888 A1* | 10/2023 | Kato | B60W 30/18163 |
| | | | 701/41 |
| 2023/0399004 A1* | 12/2023 | Lee | B60W 50/14 |
| 2024/0208527 A1* | 6/2024 | Tsujino | B60W 50/14 |

FOREIGN PATENT DOCUMENTS

| | | | | |
|---|---|---|---|---|
| JP | 2017084112 A | * | 5/2017 | |
| JP | 2018-103766 A | | 7/2018 | |
| JP | 2018-103768 A | | 7/2018 | |
| JP | 2019-167094 A | | 10/2019 | |
| JP | 2019-174459 A | | 10/2019 | |
| JP | 2021-009133 A | | 1/2021 | |
| KR | 20160139748 A | * | 12/2016 | |
| WO | WO-2019004245 A1 | * | 1/2019 | B60K 35/00 |
| WO | 2019/189515 A1 | | 10/2019 | |
| WO | 2020/230612 A1 | | 11/2020 | |

\* cited by examiner

VEHICLE INFORMATION OUTPUT CONTROL DEVICE, VEHICLE INFORMATION OUTPUT CONTROL METHOD, AND STORAGE MEDIUM

CROSS-REFERENCE TO RELATED APPLICATION

This application claims priority to Japanese Patent Application No. 2022-209002 filed on Dec. 26, 2022, incorporated herein by reference in its entirety.

BACKGROUND

1. Technical Field

The present disclosure relates to vehicle information output control devices, vehicle information output control methods, and storage media.

2. Description of Related Art

A lane change assist (LCA) system that assists with a steering operation for making a lane change is known as one of advanced driver assistance systems (ADAS) installed in a vehicle. Japanese Unexamined Patent Application Publication No. 2019-167094 (JP 2019-167094 A) proposes displaying a predetermined indicator in a projection area of a head-up display (HUD) device in order to indicate that a lane change assist system is functioning properly.

However, the technique described in JP 2019-167094 A has room for improvement because it does not allow to grasp the direction in which a lane change is possible by activation of the lane change assist system.

SUMMARY

In view of the above circumstances, the present disclosure provides a vehicle information output control device, vehicle information output control method, and storage medium that allow to grasp the direction in which a lane change can be performed by a lane change assist system.

A vehicle information output control device according to an aspect of the present disclosure includes a processor. The processor is configured to: acquire direction information on a direction in which a lane change is possible by activation of a lane change assist system; and based on the direction information, cause a display unit in a vehicle cabin to output a direction image indicating the direction in which the lane change is possible.

According to this aspect, the processor causes the display unit located in the vehicle cabin to output the direction image indicating the direction in which a lane change is possible. A user looking at the display unit can therefore grasp the direction in which a lane change by the lane change assist system is possible.

The direction image may include a steering image indicating steering, a right direction image displayed to right of the steering image and indicating the lane change to right, and a left direction image displayed to left of the steering image and indicating the lane change to left.

The display of the right direction image shows that a lane change to the right is possible. The display of the left direction image shows that a lane change to the left is possible. Since the right direction image and the left direction image are displayed to the right and left of the steering image, it is possible to intuitively grasp the direction in which a lane change is possible from the positional relationship with the steering image.

The processor may be configured to show the direction in which the lane change is possible by displaying either the right direction image or the left direction image, whichever corresponds to the direction in which the lane change is possible, in a highlighted state by changing either or both of brightness and color of the image.

According to this aspect, either the right direction image or the left direction image, whichever corresponds to the direction in which a lane change is possible, is displayed in a highlighted state by changing either or both of brightness and color of the image. The direction image can thus show the direction in which a lane change is possible without changing the shapes of the right direction image and the left direction image. As a result, the consistency of the display of the direction image can be maintained, which can reduce annoyance the user feels with the display.

The processor may be configured to, when the lane change is going to be performed by the activation of the lane change assist system, show that the lane change is going to be performed by rotating the steering image in the direction of the lane change.

According to this aspect, when the lane change is going to be performed by the activation of the lane change assist system, the steering image is rotated in the direction of the lane change. The rotational direction of the steering image is thus synchronized with the steering operation of the steering wheel, which allows to intuitively grasp the direction in which the vehicle moves.

The lane change by the activation of the lane change assist system may be performed when a lane change assist request for the lane change in the direction in which the lane change is possible is received in response to operation of a driver. The processor may be configured to, when the lane change assist request has been received but the lane change is not going to be performed, cause an audio output unit in the vehicle cabin to output audio data informing that the lane change is not going to be performed.

According to this aspect, in the case where a lane change assist request has been received but the lane change is not going to be performed, audio data is output to inform that the lane change is not going to be performed. This can reduce anxiety the driver feels when a lane change operation is not performed at the expected timing after he or she requested lane change assistance. Moreover, providing guidance using the audio data can reduce the frequency at which the display of the display unit is switched and can thus reduce annoyance the user feels.

A vehicle information output control method according to another aspect of the present disclosure includes: acquiring direction information on a direction in which a lane change is possible by activation of a lane change assist system; and based on the direction information, causing a display unit in a vehicle cabin to output a direction image indicating the direction in which the lane change is possible.

A non-transitory storage medium according to still another aspect of the present disclosure stores instructions that are executable by one or more processors and that cause the one or more processors to perform functions. The functions include: acquiring direction information on a direction in which a lane change is possible by activation of a lane change assist system; and based on the direction information, causing a display unit in a vehicle cabin to output a direction image indicating the direction in which the lane change is possible.

As described above, the vehicle information output control device, the vehicle information output control method, and the storage medium according to the present disclosure allow to grasp the direction in which a lane change can be performed by the lane change assist system.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

A vehicle information output control device 10 according to an embodiment will be described with reference to FIGS. 1 to 6.

Figure 1:
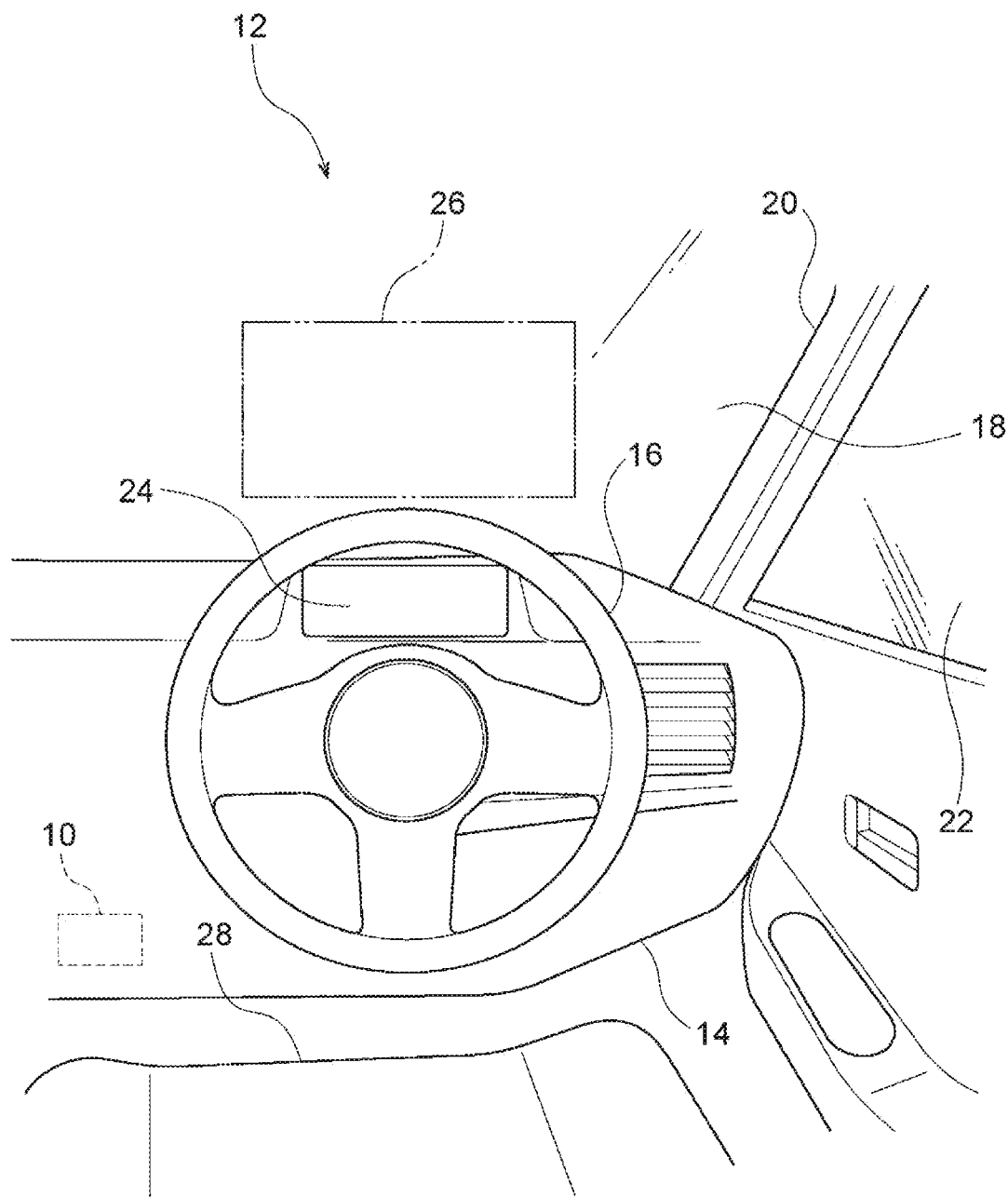
FIG. 1 is a schematic view of a front part of a vehicle cabin of a vehicle to which a vehicle information output control device according to an embodiment is applied, as viewed from the rear side of the vehicle.

As shown in FIG. 1, an instrument panel 14 is installed in the front part of a vehicle cabin of a vehicle 12. The instrument panel 14 extends in the lateral direction of the vehicle 12, and a steering wheel 16 is installed on the right side of the instrument panel 14 in the lateral direction of the vehicle 12. That is, in the present embodiment, as an example, the vehicle is a right-hand drive vehicle with the steering wheel 16 on the right side, and a driver's seat 28 is on the right side of the vehicle 12.

A windshield glass 18 is installed at the front end of the instrument panel 14. The windshield glass 18 extends in the vertical and lateral directions of the vehicle 12 and separates the inside and outside of the vehicle cabin.

The right end of the windshield glass 18 in the lateral direction of the vehicle 12 is fixed to a front pillar 20 on the right side of the vehicle 12. Specifically, the front pillar 20 extends substantially in the vertical direction of the vehicle 12. The windshield glass 18 is fixed to the inner end of the front pillar 20 in the lateral direction of the vehicle 12. The front end of a front side glass 22 is fixed to the outer end of the front pillar 20 in the lateral direction of the vehicle 12. The left end of the windshield glass 18 in the lateral direction of the vehicle 12 is fixed to a front pillar on the left side of the vehicle 12, not shown.

A first display unit 24 as a display unit is mounted on the instrument panel 14. The first display unit 24 is a display mounted on the right side of the instrument panel 14 in the lateral direction of the vehicle 12, and is located in front of the driver's seat 28 in the longitudinal direction of the vehicle 12. A predetermined image is displayed on the first display unit 24 by a meter display device 44 (see FIG. 2) as a vehicle display device. The first display unit 24 is connected to various meter devices mounted on the vehicle 12, and is mounted at a position that is located in the field of vision of a driver when he or she looks ahead of the vehicle 12.

A second display unit 26 is located on the windshield glass 18. The second display unit 26 is set to be located above the first display unit 24 in the vertical direction of the vehicle 12, and forms a projection plane of a head-up display device 48 (see FIG. 2) as a vehicle display device. Specifically, the head-up display device 48 is installed in front of the instrument panel 14 in the longitudinal direction of the vehicle 12. The head-up display device 48 is configured to project an image onto the second display unit 26 that is a predetermined area on the windshield glass 18.

The vehicle information output control device 10 is mounted on the vehicle 12. The vehicle information output control device 10 of the present embodiment is composed of, for example, one or more electronic control units (ECUs). The vehicle information output control device 10 of the present embodiment displays various images on the first display unit 24 that is a display of the meter display device 44. The vehicle information output control device 10 displays a predetermined direction image on the first display unit 24 to display to the driver a direction in which a lane change can be made by a lane change assist (LCA) system.

Hardware Configurations of Vehicle Information Output Control Device 10

Figure 2:
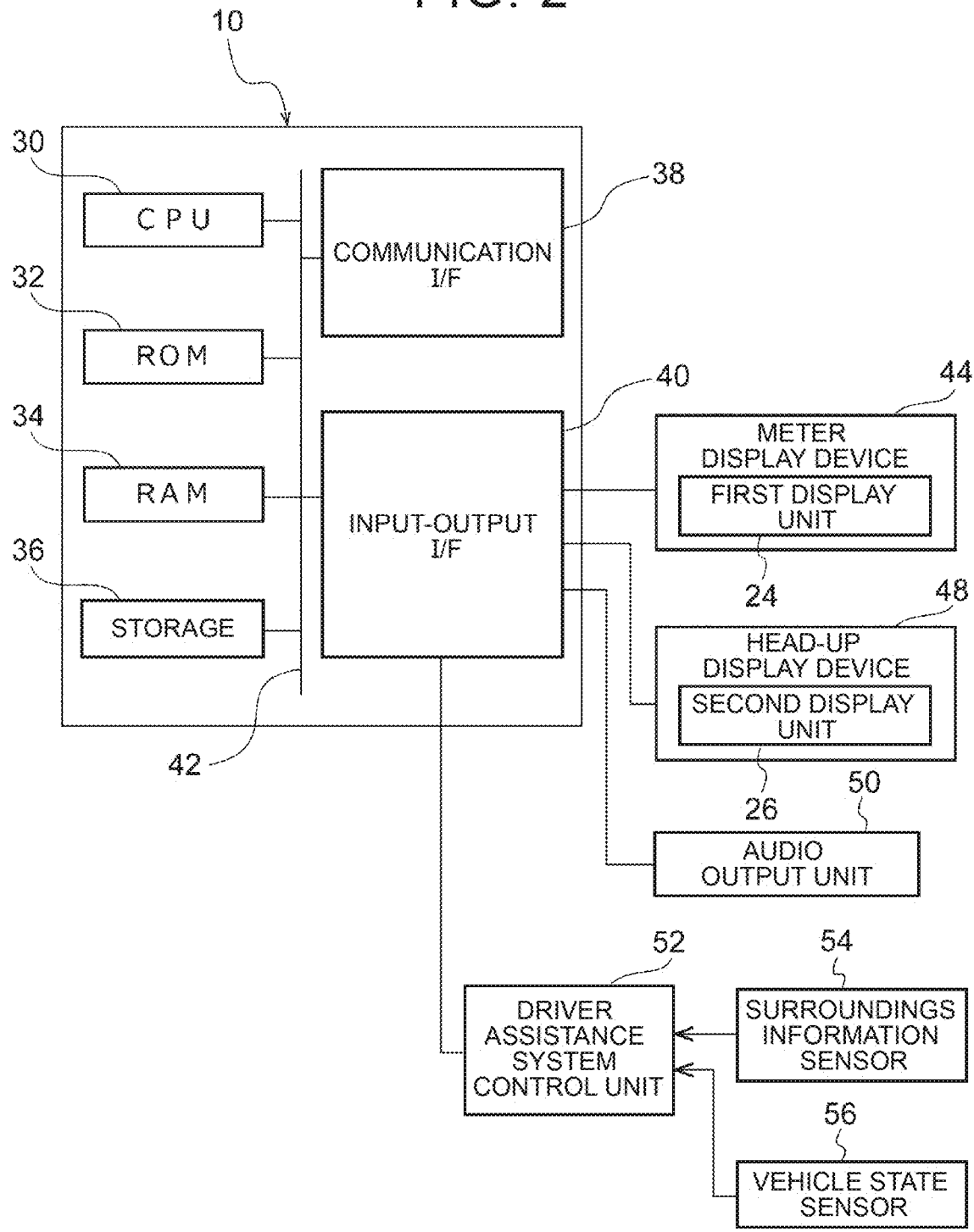
FIG. 2 is a block diagram showing hardware configurations of the vehicle information output control device according to the embodiment.

FIG. 2 is a block diagram showing hardware configurations of the vehicle information output control device 10. As shown in FIG. 2, the vehicle information output control device 10 includes a central processing unit (CPU, processor) 30, a read-only memory (ROM) 32, a random access memory (RAM) 34, a storage 36, a communication interface (communication I/F) 38, and an input-output interface (input-output I/F) 40. These configurations are connected via a bus 42 so that they can communicate with each other.

The CPU 30 is a central processing unit that executes various programs and controls each unit. That is, the CPU 30 reads the programs from the ROM 32 or the storage 36 and executes the programs using the RAM 34 as a work area. The CPU 30 controls each of the above configurations and executes various kinds of arithmetic processing in accordance with the programs recorded on the ROM 32 or the storage 36.

The ROM 32 stores various programs and various kinds of data. The RAM 34 serves as a work area and temporarily stores programs or data. The storage 36 is a hard disk drive (HDD) or a solid state drive (SSD), and stores various programs including an operating system and various kinds of data. In the present embodiment, the ROM 32 or the storage 36 stores a program, various kinds of data, etc. for performing an output process that will be described later.

The communication I/F 38 is an interface for the vehicle information output control device 10 to communicate with an external server and other devices. For example, a standard such as controller area network (CAN), Ethernet (registered trademark), long-term evolution (LTE), fiber distributed data interface (FDDI), or Wi-Fi (registered trademark) is used for the communication I/F 38.

The input-output I/F 40 is electrically connected to the meter display device 44, the head-up display device 48, an audio output unit 50, and a driver assistance system control unit 52. The meter display device 44 displays predetermined information on the first display unit 24. The head-up display device 48 displays predetermined information on the second display unit 26. The audio output unit 50 is, for example, a speaker installed in the vehicle cabin. In the present embodiment, the audio output unit 50 outputs predetermined audio data according to a command from the vehicle information output control device 10.

The driver assistance system control unit 52 can control various driving systems mounted on the vehicle 12. The driver assistance system control unit 52 acquires surroundings information of the vehicle 12 from a surroundings information sensor 54 and acquires state information of the vehicle 12 from a vehicle state sensor 56. The surroundings information of the vehicle 12 includes information on a travel lane of the vehicle 12, detection information of objects that are present near the vehicle 12, and map data of the current location. The state information of the vehicle 12 includes a travel speed and acceleration of the vehicle 12 and operation information on any operation performed by the driver on an operation unit of the vehicle 12.

The surroundings information sensor 54 is, for example, a combination of known sensors such as a camera, an ultrasonic sensor, a millimeter wave radar, a Light Detection and Ranging (LiDAR) sensor, and a Global Positioning Sensor (GPS) reception sensor. The vehicle state sensor 56 includes, for example, a wheel speed sensor, an acceleration sensor, a yaw rate sensor, a steering angle sensor, and an operation information detection sensor.

The driver assistance system control unit 52 can control various driving systems based on the surroundings information and the state information.

The various driving systems mounted on the vehicle 12 include an automated driving system and various advanced driver assistance systems (ADAS). The driver assistance system control unit 52 controls various actuators mounted on the vehicle 12 to automatically perform part or all of the operations of the vehicle 12 such as accelerator, brakes, direction indicators, and steering to activate the various driving systems.

The driving systems mounted on the vehicle 12 include, as the ADAS, a stop system for avoiding contact between a detected object and the vehicle 12, an adaptive cruise control (ACC) system, a lane tracing assist (LTA) system, and a lane change assist (LCA) system. The stop system, the ACC system, the LTA system, and the LCA system are well known in the art (see, for example, Japanese Unexamined Patent Application Publication No. 2018-103766 (JP 2018-103766 A) and Japanese Unexamined Patent Application Publication No. 2018-103768 (JP 2018-103768 A)). Accordingly, the ACC system, the LTA system, and the LCA system relevant to the gist of the present disclosure will be briefly described.

ACC System

The ACC system is a system that assists with driving by acquiring information on the vehicle surroundings from the surroundings information sensor 54 (see FIG. 2) mounted on the vehicle and controlling accelerator and brake operations based on the acquired surroundings information.

More specifically, when there is a preceding vehicle traveling right in front of the vehicle on the vehicle's travel lane based on the surroundings information, the ACC system causes the vehicle to follow the preceding vehicle while keeping a predetermined following distance to the preceding vehicle. When there is no preceding vehicle on the vehicle's travel lane, the ACC system causes the vehicle to travel at a set constant vehicle speed.

The ACC system is activated when the driver assistance system control unit 52 receives a following distance assist request based on the driver's operation on the operation unit, not shown. The driver assistance system control unit 52 determines whether predetermined ACC system execution conditions are satisfied, and activates the ACC system when the ACC system execution conditions are satisfied.

LTA System

The LTA system is a system that assists with the driver's steering operation by applying steering torque to a steering mechanism so that the position of the vehicle is kept near a target travel line within the vehicle's travel lane. Specifically, the LTA system perceives lane markings of the vehicle's travel lane from an image of the vehicle surroundings acquired by the surroundings information sensor 54 and perceives a target travel line within the vehicle's travel lane. The LTA system then applies necessary steering torque to the steering mechanism according to the position of the vehicle with respect to the target travel line.

The LTA system is activated when the driver assistance system control unit 52 receives a steering assist request based on the driver's operation on the operation unit, not shown. The driver assistance system control unit 52 determines whether predetermined LTA system execution conditions are satisfied, and activates the LTA system when the LTA system execution conditions are satisfied.

For example, the LTA system execution conditions include the following: (1) a steering assist request has been received, (2) the ACC system is activated, (3) the vehicle speed is within a predetermined vehicle speed range, (4) the travel lane has been perceived, and (5) a blinker operation unit indicating a right turn or a left turn is not operated. The LTA system execution conditions are not limited to these conditions, and can be set as desired.

LCA System

The LCA system is a system that assists with the driver's steering operation (lane change operation) by, after it is determined based on the surroundings information of the vehicle that a safe lane change is possible, applying steering torque to the steering mechanism so that the vehicle moves from the vehicle's current lane to an adjacent lane while monitoring the surroundings of the vehicle. Therefore, according to the lane change by the LCA system, the driver's travel lane can be changed without requiring the driver's steering operation (steering wheel operation).

Specifically, the LCA system calculates a target trajectory of the vehicle based on lane information in the area in front of the vehicle supplied from the camera sensor included in the surroundings information sensor 54, the current location of the vehicle identified by the GPS reception sensor, and the travel speed of the vehicle. The target trajectory is a trajectory for moving the vehicle from the centerline of the vehicle's current travel lane to the centerline of the lane after the lane change. The LCA system calculates, based on the target trajectory, a steering angle required for the vehicle to move from the current position to a final position to be reached on the target trajectory, and applies necessary steering torque to the steering mechanism to make a lane change.

The LCA system is activated when the driver assistance system control unit 52 receives a lane change assist request based on the driver's operation on the operation unit, not shown. The driver assistance system control unit 52 determines whether predetermined LCA system execution conditions are satisfied, and activates the LCA system when the LCA system execution conditions are satisfied.

In the present embodiment, the driver assistance system control unit 52 makes a determination as to LCA reception conditions before receiving a lane change assist request from the driver. In the vehicle 12, the driver assistance system control unit 52 can receive a lane change assist request from the driver when the LCA reception conditions are satisfied.

The LCA system is a control system for controlling the vehicle's lateral position with respect to the vehicle's travel lane like the LTA system, and performs the LCA control instead of the LTA control when a lane change assist request is received during the ACC and LTA controls. Therefore, the LCA reception conditions include that the ACC system is activated and that the LTA system is activated. In the present embodiment, as an example, the following conditions (1) to (6) are set as the LCA reception conditions. The LCA reception conditions are not limited to these conditions, and can be set as desired.

(1) The ACC system is activated.
(2) The LTA system is activated.
(3) Map data of the current location of the vehicle has been acquired,
(4) The steering wheel is not being operated with a steering force equal to or larger than a predetermined value.
(5) No approaching object is detected around the vehicle.
(6) It is possible to set a target trajectory to the right or left lane.

When the driver assistance system control unit 52 determines that the LCA reception conditions are satisfied, the driver assistance system control unit 52 switches the vehicle 12 to an LCA standby state where the driver assistance system control unit 52 can receive a lane change assist request from the driver.

When the driver assistance system control unit 52 receives a lane change assist request from the driver after switching the vehicle 12 to the LCA standby state, the driver assistance system control unit 52 determines whether the LCA system execution conditions are satisfied. In the present embodiment, a lane change assist request can be made based on a predetermined operation on the blinker operation unit, not shown.

The LCA system execution conditions include, for example, the following condition (7) in addition to the above LCA reception conditions (1) to (6).

(7) A lane change assist request for a lane change in a direction in which a lane change is possible by activation of the LCA system has been received.

In the present embodiment, a lane change assist request for a lane change to the right lane and a lane change assist request for a lane change to the left lane can be made based on a predetermined operation on the blinker operation unit, not shown. Therefore, for example, it is assumed that only a target trajectory to the right lane has been set when making a determination as to the LCA reception conditions. In this case, when a lane change assist request to the right lane is received from the driver, the above condition (7) is satisfied. On the other hand, when a lane change assist request to the left lane is received from the driver, the condition (7) is not satisfied, and the driver assistance system control unit 52 therefore does not perform a lane change by activation of the LCA system.

Functional Configurations of Vehicle Information Output Control Device 10

The vehicle information output control device 10 implements various functions using the above hardware resources. Functional configurations implemented by the vehicle information output control device 10 will be described with reference to FIG. 3.

Figure 3:
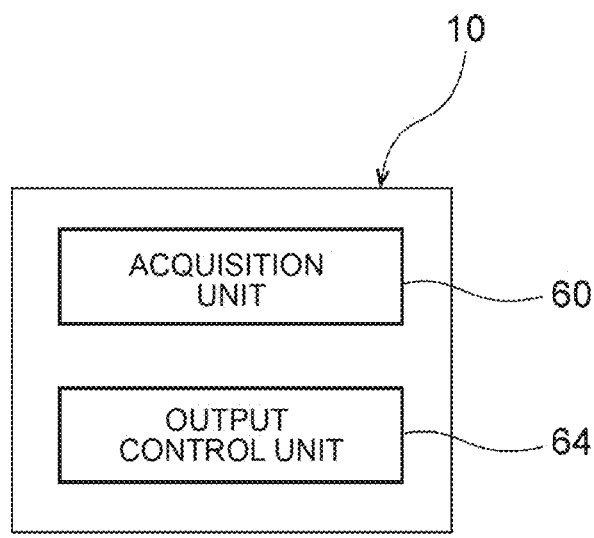
FIG. 3 is a block diagram showing functional configurations of the vehicle information output control device according to the embodiment.

As shown in FIG. 3, the vehicle information output control device 10 includes an acquisition unit 60 and an output control unit 64 as the functional configurations. Each functional configuration is implemented by the CPU 30 reading and executing the programs stored in the ROM 32 or the storage 36.

The acquisition unit 60 acquires, from the driver assistance system control unit 52, information on activation of the various driving systems and operation information on any operation performed on the operation unit of the vehicle 12. Particularly in the present embodiment, the acquisition unit 60 acquires information on the determination result of the LCA reception conditions, the determination result of the LCA system execution conditions, and a lane change assist request based on the driver's operation.

The output control unit 64 controls image data to be output to the first display unit 24 in the vehicle cabin and audio data to be output to the audio output unit 50 based on the information acquired by the acquisition unit 60. Specifically, when activation of the ACC system and activation of the LTA system of the vehicle 12 are detected by the function of the acquisition unit 60, the output control unit 64 selects a predetermined direction image from a plurality of pieces of image data stored in advance in the storage 36, and outputs the selected direction image.

The direction image itself is an icon image for informing the driver of the presence of the LCA system, and is displayed to indicate the direction in which a lane change is possible by the activation of the LCA system.

Figure 4:
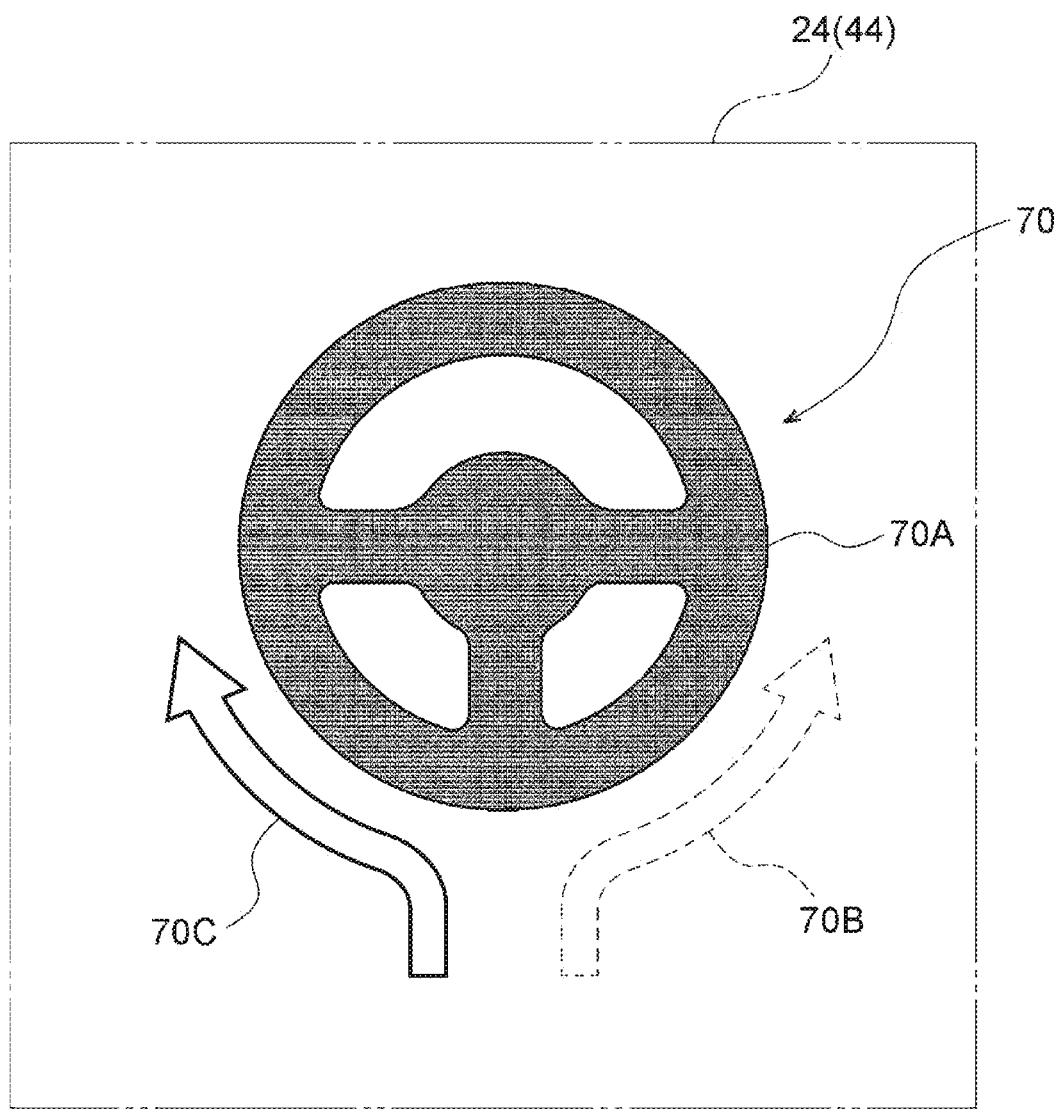
FIG. 4 shows an example of a direction image showing a direction in which a lane change can be performed by a lane change assist system.

As shown in FIG. 4, a direction image 70 of the present embodiment includes a steering image 70A indicating steering, a right direction image 70B indicating a lane change to the right, and a left direction image 70C indicating a lane change to the left.

The steering image 70A forms the central portion of the direction image 70. The right direction image 70B can be displayed to the right of the steering image 70A. The right direction image 70B is an image of an arrow indicating the right direction to the steering image 70A. The left direction image 70C can be displayed to the left of the steering image 70A. The left direction image 70C is an image of an arrow indicating the left direction to the steering image 70A.

The direction image 70 starts to be displayed with activation of the ACC system and activation of the LTA system of the vehicle 12. The direction image 70 shows the driver the activated state of the LCA system by displaying each of the steering image 70A, the right direction image 70B, and the left direction image 70C in a highlighted state by changing either or both of the brightness and color thereof.

The steering image 70A is always displayed in a highlighted state when the ACC system and the LTA system are activated, regardless of whether the LCA reception conditions are satisfied. Therefore, by displaying the steering image 70A in a highlighted state, it is possible to inform the driver that the vehicle 12 has been detecting a direction in which a lane change is possible by activation of the LCA system. As shown in FIG. 4, the steering image 70A is highlighted by, for example, being displayed in "green" with high brightness.

When the LCA system execution conditions are satisfied, the steering image 70A is highlighted by being displayed as an animated image, namely the steering image 70A rotating in a direction in which a lane change is possible by activation of the LCA system. That is, when a lane change is going to be performed by activation of the LCA system, the steering image 70A is rotated in the direction of the lane change to inform that the lane change is going to be performed. In the example shown in FIG. 5, the steering image 70A is rotated to the left to inform the driver that a lane change to the left lane is going to be performed.

The right direction image 70B and the left direction image 70C are displayed in a highlighted state when they correspond to the direction in which a lane change is possible. Specifically, for example, as shown in FIG. 4, when it is detected that it is possible for the vehicle 12 to perform a lane change to the left lane, the left direction image 70C is highlighted by being displayed in "white" with high brightness.

On the other hand, the right direction image 70B and the left direction image 70C are displayed in a low-brightness color in an inconspicuous manner when they do not correspond to the direction in which a lane change is possible. As used herein, "displaying in an inconspicuous manner" includes a non-displayed state.

When the LCA system execution conditions are satisfied, the right direction image 70B and the left direction image 70C are highlighted by being displayed with the color changed from "white" to "green." That is, when a lane change is going to be performed by activation of the LCA system, the color of either the right direction image 70B or the left direction image 70C, whichever corresponds to the direction of the lane change, is changed to the same color as the steering image 70A to inform that the lane change is going to be performed. In the example shown in FIG. 5, the left direction image 70C is displayed in the same color as the steering image 70A to inform the driver that a lane change to the left lane is going to be performed.

When a lane change is not going to be performed for some reason after the LCA reception conditions are satisfied and a lane change assist request based on the driver's operation is received, the output control unit 64 outputs audio data informing that the lane change is not going to be performed. As used herein, "when a lane change is not going to be performed for some reason" includes the case where at least one of the above LCA system execution conditions (1) to (6) becomes no longer satisfied after a lane change assist request is received. Alternatively, the condition (7) becomes no longer satisfied because a lane change assist request for a lane change in a direction different from the direction in which a lane change is possible as determined by the LCA system is received from the driver.

The output control unit 64 selects a predetermined piece of audio data from a plurality of pieces of audio data stored in advance in the storage 36 according to the reason why the lane change is not going to be performed. For example, when the lane change is not going to be performed because the vehicle 12 is traveling at a speed higher than a prescribed travel speed, the audio output unit 50 may output audio data "lane change assist is not available because the travel speed is higher than the prescribed speed."

Functions

Next, functions of the present embodiment will be described.

Output Process

Figure 6:
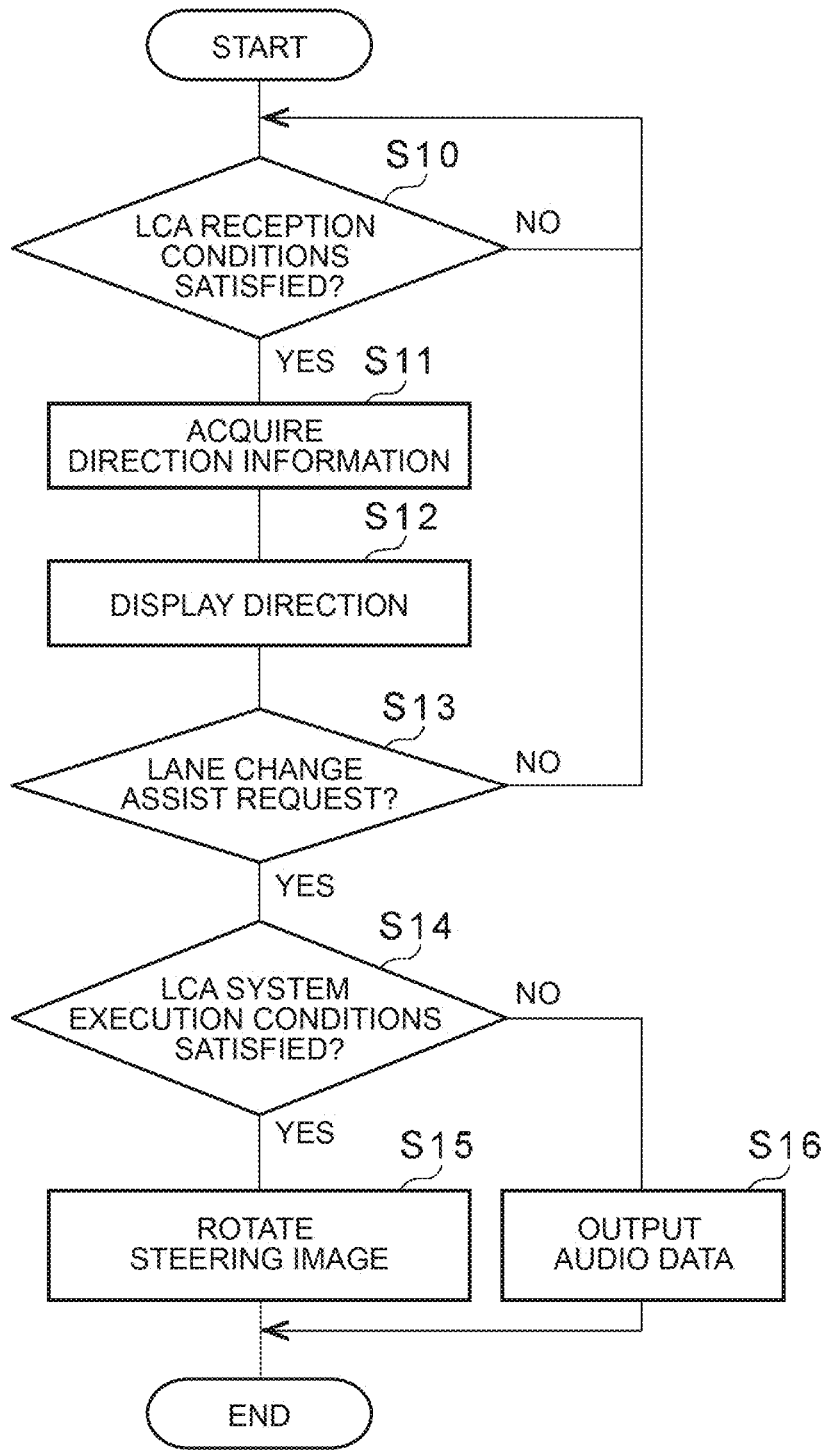
FIG. 6 is a flowchart showing an example of the flow of an output process according to the embodiment.

An example of the output process of the vehicle information output control device 10 according to the present embodiment will be described with reference to the flowchart shown in FIG. 6. The output process is performed by the CPU 30 reading a program from the ROM 32 or the storage 36, loading the program into the RAM 34, and executing the program. The output process is performed when the ACC system and the LTA system are activated. At this time, the direction image 70 with the steering image 70A highlighted is displayed on the first display unit 24 in the vehicle cabin.

In step S10, the CPU 30 determines whether the LCA reception conditions are satisfied. Specifically, the CPU 30 uses the function of the acquisition unit 60 to acquire the result of the determination made by the driver assistance system control unit 52 as to whether the LCA reception conditions are satisfied. When it is determined that the LCA reception conditions are satisfied, the determination result in step S10 is Yes, and the process proceeds to step S11. On the other hand, when No in step S10, the process returns to step S10. When No in step S10, only the steering image 70A is highlighted, and each of the right direction image 70B and the left direction image 70C is displayed in a low-brightness color.

In step S11, the CPU 30 uses the function of the acquisition unit 60 to acquire direction information on a direction in which a lane change is possible by activation of the LCA system.

In step S12, the CPU 30 uses the function of the output control unit 64 to display the direction in which a lane change is possible based on the acquired direction information. Specifically, the direction image 70 is displayed with either the right direction image 70B or the left direction image 70C, whichever corresponds to the direction in which a lane change is possible, being highlighted. When the driver assistance system control unit 52 determines that lane changes to the right and left are possible, both the right direction image 70B and the left direction image 70C are displayed in a highlighted state.

In step S13, the CPU 30 determines whether a lane change assist request based on the driver's operation has been received. Specifically, the CPU 30 uses the function of the acquisition unit 60 to acquire operation information on any operation performed on the operation unit in the vehicle cabin from the driver assistance system control unit 52, and determines whether operation information corresponding to a lane change assist request has been detected. When the CPU 30 determines that a lane change assist request has been received, the determination result in step S13 is Yes, and the process proceeds to step S14. On the other hand, when the CPU 30 determines that a lane change assist request has not been received, the determination result in step S13 is No, and the process returns to step S10.

In step S14, the CPU 30 determines whether the LCA system execution conditions are satisfied. Specifically, the CPU 30 uses the function of the acquisition unit 60 to acquire the result of the determination made by the driver assistance system control unit 52 as to whether the LCA system execution conditions are satisfied. When the LCA system execution conditions are satisfied and a lane change is going to be performed, the determination result in step S14 is Yes, and the process proceeds to step S15. On the other hand, when the LCA system execution conditions are not satisfied and a lane change is not going to be performed, the determination result in step S14 is No, and the process proceeds to step S16.

In step S15, the CPU 30 uses the function of the output control unit 64 to rotate the steering image 70A in the direction of the lane change, and thus informs that the lane change is going to be performed.

In step S16, the CPU 30 uses the function of the output control unit 64 to cause the audio output unit 50 to output audio data informing that the lane change is not going to be performed.

As described above, the vehicle information output control device 10 according to the present embodiment outputs to the first display unit 24 in the vehicle cabin a direction image indicating a direction in which a lane change is possible. The user looking at the first display unit 24 can therefore grasp the direction in which a lane change by the LCA system is possible.

As shown in FIG. 4, the direction image 70 of the present embodiment includes the steering image 70A indicating steering, the right direction image 70B indicating a lane change to the right, and the left direction image 70C indicating a lane change to the left. Therefore, the display of the right direction image 70B shows that a lane change to the right is possible. The display of the left direction image 70C shows that a lane change to the left is possible. Since the right direction image 70B and the left direction image 70C are displayed to the right and left of the steering image 70A, it is possible to intuitively grasp the direction in which a lane change is possible from the positional relationship with the steering image 70A.

In the present embodiment, either the right direction image 70B or the left direction image 70C, whichever corresponds to the direction in which a lane change is possible, is displayed in a highlighted state by changing either or both of brightness and color of the image. The direction image 70 can thus show the direction in which a lane change is possible without changing the shapes of the right direction image 70B and the left direction image 70C. As a result, the consistency of the display of the direction image 70 can be maintained, which can reduce annoyance the user feels with the display.

Figure 5:
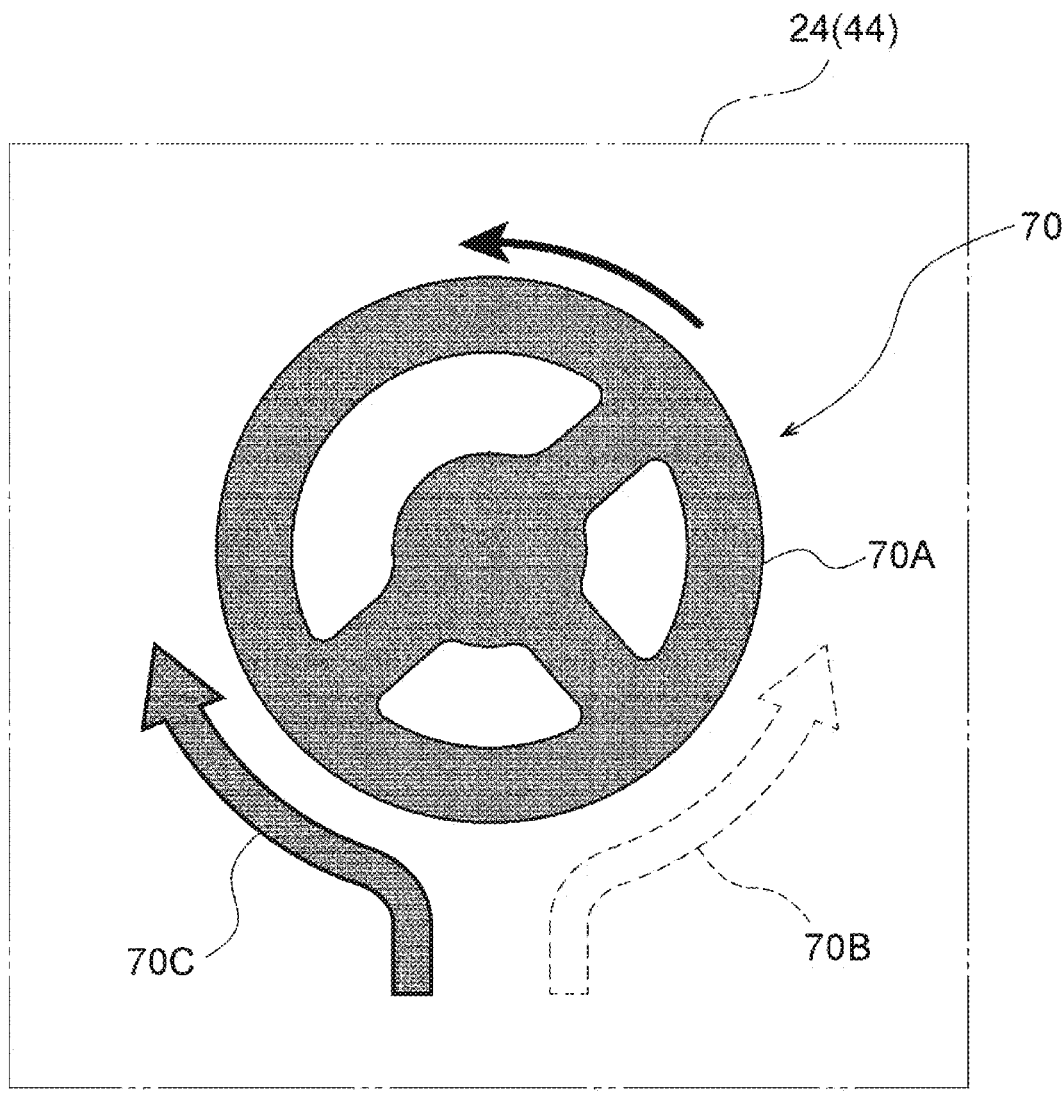
FIG. 5 shows an example of a direction image showing that a lane change is going to be performed by the lane change assist system.

In the present embodiment, as shown in FIG. 5, when a lane change is going to be performed by activation of the LCA system, the steering image 70A is rotated in the direction of the lane change. The rotational direction of the steering image is thus synchronized with the steering operation of the steering wheel, which allows to intuitively grasp the direction in which the vehicle moves. Since the color of either the right direction image 70B or the left direction image 70C, whichever corresponds to the direction of the lane change, is changed to the same color as the steering image 70A and displayed, the direction of the lane change is further emphasized.

In the present embodiment, in the case where a lane change assist request has been received but a lane change is not going to be performed, audio data is output to inform that the lane change is not going to be performed. This can reduce anxiety the driver feels when a lane change operation is not performed at the expected timing after he or she requested lane change assistance. Moreover, providing guidance using audio data can reduce the frequency at which the display of the display unit is switched and can thus reduce annoyance the user feels.

Although the vehicle display device according to the embodiment is described above, the present disclosure can be carried out in various forms without departing from the spirit and scope of the present disclosure. For example, in the above embodiment, the first display unit 24 of the meter display device 44 is configured to display the direction image 70. However, the present disclosure is not limited to this. For example, the second display unit 26 of the head-up display device 48 may be configured to display the direction image 70.

Various processors other than the CPU 30 may perform the processes that are performed by the CPU 30 by reading the programs in the above embodiment. In this case, examples of the processors include: a programmable logic device (PLD) whose circuit configuration can be changed after manufacturing, such as a field-programmable gate array (FPGA); and a dedicated electrical circuit that is a processor having a circuit configuration designed exclusively to perform a specific process, such as an application-specific integrated circuit (ASIC). The processes may be performed by one of the various processors, or may be performed by a combination of two or more processors of the same type or different types, such as a plurality of FPGAs or a combination of a CPU and an FPGA. The hardware configurations of the various processors are, more specifically, electrical circuitry composed of a combination of circuit elements such as semiconductor elements.

In the above embodiment, various kinds of data are stored in the storage 36. However, the present disclosure is not limited to this. For example, a non-transitory recording medium such as a compact disk (CD), a digital versatile disk (DVD), or a universal serial bus (USB) memory may be used as a storage unit. In this case, various programs, data, etc. are stored in these recording media.

APPENDIX (I) A vehicle information output control device comprising:
an acquisition unit that acquires direction information on a direction in which a lane change is possible by activation of a lane change assist system, and
an output control unit that causes a display unit in a vehicle cabin to output a direction image indicating the direction in which the lane change is possible based on the direction information.

(II) The vehicle information output control device according to Item (I), wherein the direction image includes
a steering image indicating steering,
a right direction image displayed to right of the steering image and indicating the lane change to right, and a left direction image displayed to left of the steering image and indicating the lane change to left.

(III) The vehicle information output control device according to Item (II), wherein the output control unit shows the direction in which the lane change is possible by displaying either the right direction image or the left direction image, whichever corresponds to the direction in which the lane change is possible, in a highlighted state by changing either or both of brightness and color of the image.

(IV) The vehicle information output control device according to Item (II) or (III), wherein, when the lane change is going to be performed by the activation of the lane change assist system, the output control unit shows that the lane change is going to be performed by rotating the steering image in the direction of the lane change.

(V) The vehicle information output control device according to any one of Items (I) to (IV), wherein:
the lane change by the activation of the lane change assist system is performed when a lane change assist request for the lane change in the direction in which the lane change is possible is received in response to operation of a driver; and
when the lane change assist request has been received but the lane change is not going to be performed, the output control unit causes an audio output unit in the vehicle cabin to output audio data informing that the lane change is not going to be performed.

What is claimed is:
1. A vehicle information output control device comprising a processor configured to:
acquire direction information on a direction in which a lane change is possible by activation of a lane change assist system, and based on the direction information, cause a display unit in a vehicle cabin to output a direction image indicating the direction in which the lane change is possible, wherein
- the lane change by the activation of the lane change assist system is performed when a lane change assist request for the lane change in the direction in which the lane change is possible is received in response to operation of a driver; and
- the processor is configured to, in response to the lane change assist request having been received and a determination by the processor that the lane change is not going to be performed, cause an audio output unit in the vehicle cabin to output audio data informing that the lane change is not going to be performed.

2. The vehicle information output control device according to claim 1, wherein the direction image includes
- a steering image indicating steering,
- a right direction image displayed to right of the steering image and indicating the lane change to right, and
- a left direction image displayed to left of the steering image and indicating the lane change to left.

3. The vehicle information output control device according to claim 2, wherein the processor is configured to show the direction in which the lane change is possible by displaying either the right direction image or the left direction image, whichever corresponds to the direction in which the lane change is possible, in a highlighted state by changing either or both of brightness and color of the image.

4. The vehicle information output control device according to claim 2, wherein the processor is configured to, when the lane change is going to be performed by the activation of the lane change assist system, show that the lane change is going to be performed by rotating the steering image in the direction of the lane change.

5. The vehicle information output control device according to claim 1, wherein the lane change assist system is configured to autonomously control steering of the vehicle to perform the lane change without requiring driver steering input, and wherein the direction information indicates a direction in which the lane change assist system is capable of autonomously performing the lane change.

6. A vehicle information output control method comprising:
- acquiring direction information on a direction in which a lane change is possible by activation of a lane change assist system; and
- based on the direction information, causing a display unit in a vehicle cabin to output a direction image indicating the direction in which the lane change is possible, wherein
  - the lane change by the activation of the lane change assist system is performed when a lane change assist request for the lane change in the direction in which the lane change is possible is received in response to operation of a driver; and
- the method includes, in response to the lane change assist request having been received and determining that the lane change is not going to be performed, causing an audio output unit in the vehicle cabin to output audio data informing that the lane change is not going to be performed.

7. A non-transitory storage medium storing instructions that are executable by one or more processors and that cause the one or more processors to perform functions comprising:
- acquiring direction information on a direction in which a lane change is possible by activation of a lane change assist system; and
- based on the direction information, causing a display unit in a vehicle cabin to output a direction image indicating the direction in which the lane change is possible, wherein
  - the lane change by the activation of the lane change assist system is performed when a lane change assist request for the lane change in the direction in which the lane change is possible is received in response to operation of a driver; and
- the one or more processors are configured to, in response to the lane change assist request having been received and determining by the one or more processors that the lane change is not going to be performed, cause an audio output unit in the vehicle cabin to output audio data informing that the lane change is not going to be performed.

* * * * *